United States Patent [19]
Ono et al.

[11] Patent Number: 5,311,363
[45] Date of Patent: May 10, 1994

[54] FIXED-FOCAL-LENGTH LENS SYSTEM

[75] Inventors: Kuniaki Ono; Masao Mori, both of Saitama, Japan

[73] Assignee: Fuji Photo Optical Co., Ltd., Saitama, Japan

[21] Appl. No.: 76,640

[22] Filed: Jun. 15, 1993

[30] Foreign Application Priority Data

Jun. 30, 1992 [JP] Japan .................................. 4-172195

[51] Int. Cl.$^5$ .............................................. G02B 9/04
[52] U.S. Cl. ...................................... 359/753; 359/793
[58] Field of Search ................ 359/651, 691, 689–690, 359/748, 753, 784, 785, 793, 795

[56] References Cited

U.S. PATENT DOCUMENTS 5,233,474  8/1993  Hirakawa ............................. 359/793

FOREIGN PATENT DOCUMENTS 61-188512  8/1986  Japan .
6461714  3/1989  Japan .

Primary Examiner—Bruce Y. Arnold
Assistant Examiner—James Phan
Attorney, Agent, or Firm—Sixbey, Friedman, Leedom & Ferguson

[57] ABSTRACT

A fixed-focal-length lens system includes first and second lens groups arranged in order from front to rear. The first lens group consists of a plurality of lenses and has a negative refracting power and the second lens group consists of a plurality of lenses and has a positive refracting power. The fixed-focal-length lens system satisfies the following conditions $$0.58 < |f_1/f| < 0.95 \tag{1}$$

$$0.50 < |f_1/f_2| < 1.0 \tag{2}$$

$$1.6 < Bf/f < 2.9 \tag{3}$$

$$1.1 < f_2/f < 1.45 \tag{4}$$

wherein f represents the focal length of the fixed-focal-length lens system, $f_1$ represents the focal length of the first lens group, $f_2$ represents the focal length of the second lens group and Bf represents the back focus of the lens system.

4 Claims, 7 Drawing Sheets

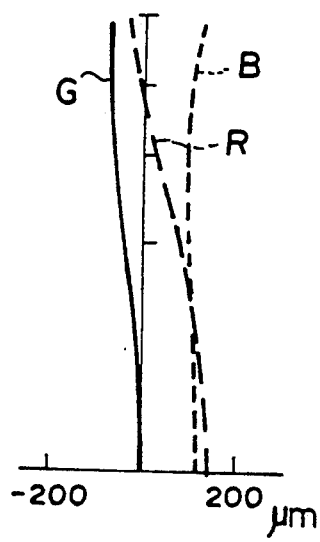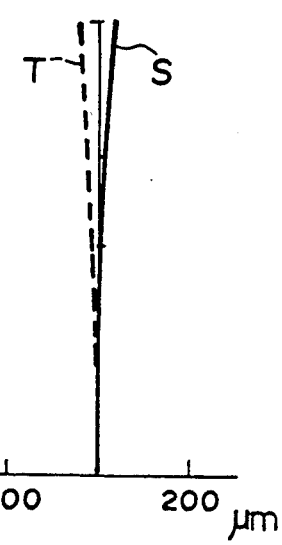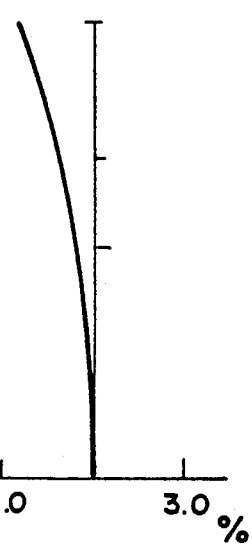

FIXED-FOCAL-LENGTH LENS SYSTEM

BACKGROUND OF THE INVENTION

1. Field of the Invention

This invention relates to a fixed-focal-length lens system which is suitable for use as a projector lens in an enlarger or the like.

2. Description of the Prior Art

In a photographic enlarger for printing images borne by a negative film on a photographic paper, there has been used an orthometer type fixed-focal-length lens system due to easiness in correction of aberrations such as distortion.

However the known orthometer type fixed-focal-length lens system is disadvantageous in that the back focus (the distance between the negative film and the lens surface nearest to the negative film) is short and a mirror which is positioned between the lens system and the negative film to lead light transmitted through the negative film to a light measuring circuit for color correction makes it difficult for the operator to view the negative film when printing images borne by the negative film on a photographic paper.

Though, in a retro-focus type fixed-focal-length lens system, the back focus can be relatively long as compared with its focal length as disclosed, for instance, in Japanese Unexamined Patent Publication Nos. 64(1989)-61714 and 61(1986)-188512, the retro-focus type fixed-focal-length lens system is short in its focal length itself (10 mm or so) and accordingly its back focus cannot be sufficiently long. Further the retro-focus type fixed-focal-length lens system is disadvantageous in that it is difficult to correct aberrations when used at high magnifications due to an asymmetric arrangement with respect to the stop.

SUMMARY OF THE INVENTION

In view of the foregoing observations and description, the primary object of the present invention is to provide a fixed-focal-length lens system which has a high magnification and a long back focus as well as excellent aberration properties.

The fixed-focal-length lens system in accordance with the present invention comprises first and second lens groups arranged in this order from front to rear, the first lens group consisting of a plurality of lenses and having a negative refracting power and the second lens group consisting of a plurality of lenses and having a positive refracting power, and satisfies the following conditions $$0.58 < |f_1/f| < 0.95 \quad (1)$$

$$0.50 < |f_1/f_2| < 1.0 \quad (2)$$

$$1.6 < Bf/f < 2.9 \quad (3)$$

$$1.1 < f_2/f < 1.45 \quad (4)$$

wherein f represents the focal length of the fixed-focal-length lens system, $f_1$ represents the focal length of the first lens group, $f_2$ represents the focal length of the second lens group and Bf represents the back focus (the distance between the negative film and the lens surface nearest to the negative film) of the lens system.

The meaning of the above conditions will hereinbelow be described in detail.

Conditions (1) and (2) are for minimizing aberrations and elongating the back focus. That is, if $|f_1/f|$ falls below 0.58 or $|f_1/f_2|$ falls below 0.50, aberrations become so large that the number of the lens elements must be increased to correct the aberrations, which is undesirable in view of simplifying the structure of the lens system. If $|f_1/f|$ exceeds 0.95 or $|f_1/f_2|$ exceeds 1.0, the back focus of the fixed-focal-length lens system cannot be sufficiently long.

Condition (3) is for limiting the negative refracting power of the front lens group (the first lens group) as well as ensuring a long back focus. That is, if Bf/f falls below the lower limit, the back focus of the fixed-focal-length lens system cannot be sufficiently long. If it exceeds the upper limit, the negative refracting power of the front lens group becomes so strong that correction of aberrations becomes difficult.

Condition (4) is for limiting the positive refracting power of the rear lens group (the second lens group) as well as ensuring a long back focus. That is, if $f_2/f$ falls below the lower limit, the positive refracting power of the rear lens group becomes so strong that correction of aberrations becomes difficult. If it exceeds the upper limit, the back focus of the fixed-focal-length lens system cannot be sufficiently long.

Thus, in the fixed-focal-length lens system in accordance with the present invention which satisfies the above conditions (1) to (4), the back focus can be sufficiently long without deteriorating the image forming performance.

Further the fixed-focal-length lens system in accordance with the present invention consists of only two lens groups and is relatively simple in structure.

DESCRIPTION OF THE PREFERRED EMBODIMENTS

Figure 2:
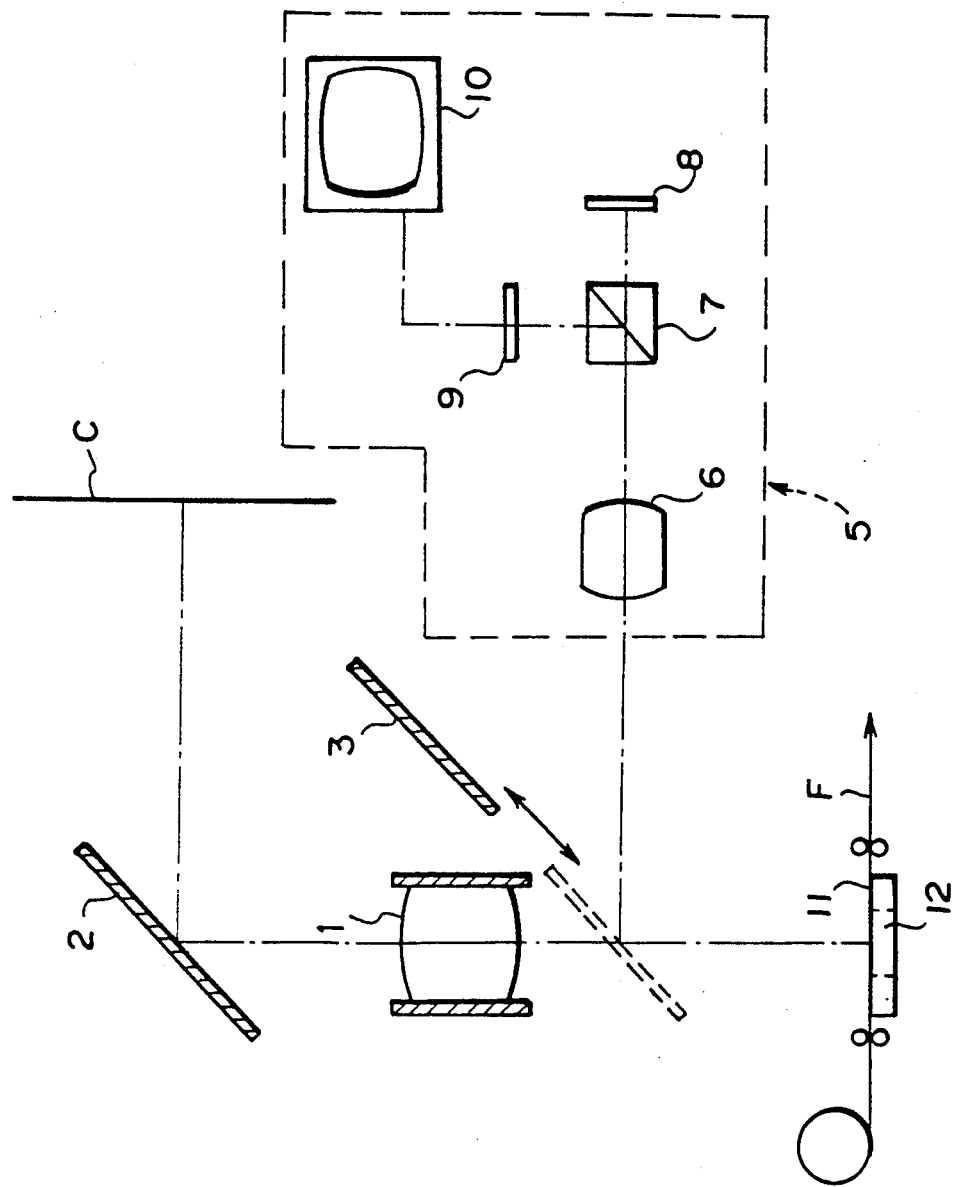
FIG. 2 is a schematic view showing an enlarger employing the lens system, FIGS. 3A to 3C respectively show spherical aberration, astigmatism and distortion of the fixed-focal-length lens system in accordance with the first embodiment.

In FIG. 2, an enlarger has a negative mask 11 having a rectangular opening 12. A negative film F is fed passing across the opening 12. An image on the negative film F is projected on a photographic paper C through a print lens system 1 and a mirror 2. A mirror 3 is movable between a retracted position shown by the solid line in FIG. 2 and an operative position shown by the broken line. When the image on the negative film F is to be projected onto the photographic paper C, the movable mirror 3 is held in the retracted position, and when the movable mirror 3 is positioned in the operative position, light transmitted through the negative film F is led to a light measuring system 5 and is focused on a photodetector 8 through a lens 6. A part of the light transmitted through the lens 6 is deflected by a split prism 7 and focused on a light receiving surface of an image pickup element 9 for a monitor 10. The image signal output from the image pickup element 9 is input into the monitor 10 and is reproduced on the monitor 10 for positioning of the negative film F and the like.

The fixed-focal-length lens system in accordance with the present invention is especially suitable as the print lens system 1, though it can be applied to various other optical instruments.

Now fixed-focal-length lens systems in accordance with first to third embodiments of the present invention will be described, hereinbelow.

In the description hereinbelow and in the drawings, the radii of curvature of the refracting surfaces, the axial surface separations (the axial air separations or thicknesses of lenses), the refractive indices for the sodium d-line and the Abbe's numbers of the lenses are respectively designated at R, d, N and $\nu$ which are numbered respectively by subscripts in order from front to rear. In this specification, the end of the lens system facing the image forming plane (the photographic paper C) will be referred to as "front", and the end of the lens system facing the negative film F will be referred to as "rear".

Figure 1:
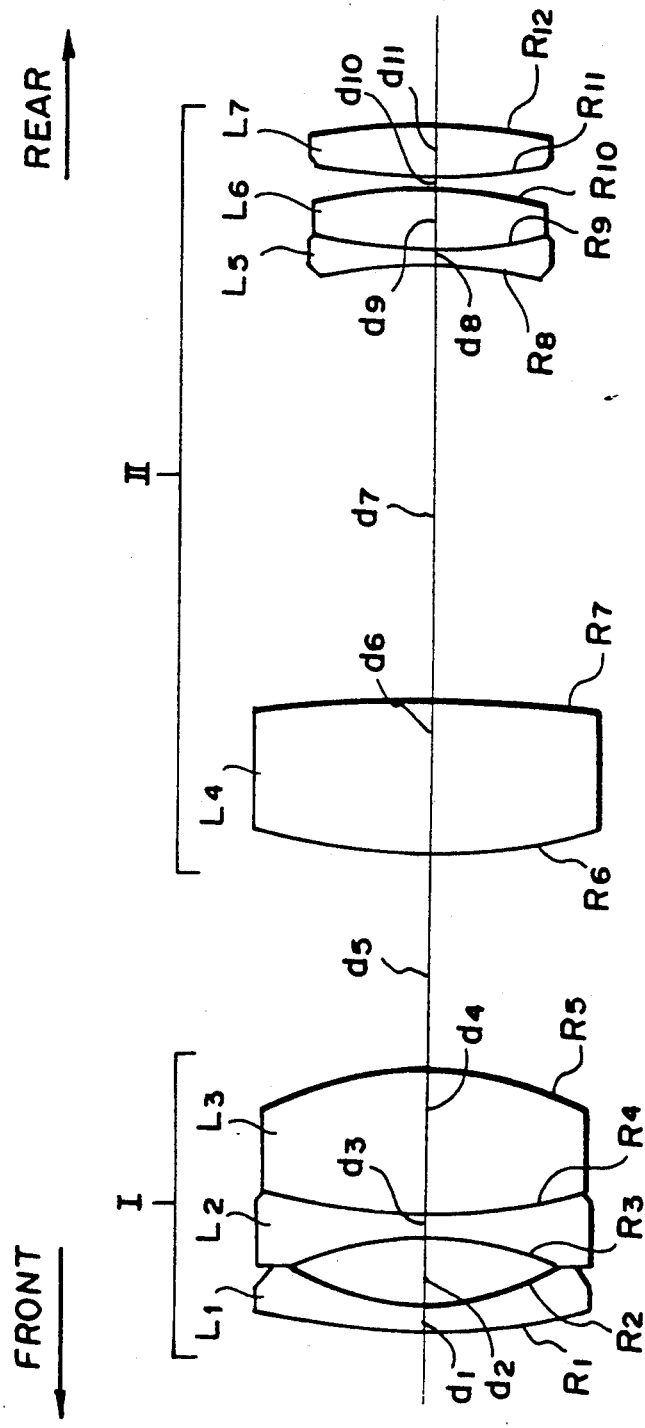
FIG. 1 is a cross-sectional view showing a fixed-focal-length lens system in accordance with a first embodiment of the present invention.

As shown in FIG. 1, the fixed-focal-length lens system in accordance with the first embodiment of the present invention comprises a first lens group I and a second lens group II arranged in this order from front to rear and satisfies the aforesaid conditions (1) to (4). The first lens group I consists of three lenses L1 to L3 arranged in this order from front to rear and has a negative refracting power. The second lens group II consists of four lenses L4 to L7 and has a positive refracting power.

The lens L1 is a negative meniscus lens convex to front, the lens L2 is a double-concave lens having the face of greater curvature faced to front, the lens L3 is a double-convex lens having the face of greater curvature faced to rear, the lens L4 is a double-convex lens having the face of greater curvature faced to front, the lens L5 is a double-concave lens having the face of greater curvature faced to rear, the lens L6 is a double-convex lens whose faces have curvatures substantially equal to each other and the lens L7 is a double-convex lens having the face of greater curvature faced to rear.

The magnification M, the focal length f(mm), the effective back focus Bf(mm), F-number $F_{NO}$ and the angle of view $2\omega$ of the fixed-focal-length lens system are as shown in table 1.

TABLE 1

| | |
|---|---|
| magnification M | −1/7.78 |
| focal length f | 58.82 |
| back focus Bf | 126.7 |
| F-number $F_{NO}$ | 6.5 |
| angle of view $2\omega$ | 14.5° |

The radii of curvature R(mm) of the respective lens surfaces, the axial surface separations d (mm) (the central thicknesses of the lenses or the air separations), the refractive indexes N for the sodium d-line of the lenses and the Abbe's numbers $\nu d$ of the lenses of the fixed-focal-length lens system of the first embodiment are as shown in table 2. In table 2, the numbers in the leftmost column represent the subscripts given to the symbols R, d and L in FIG. 1.

TABLE 2

Figure 3:
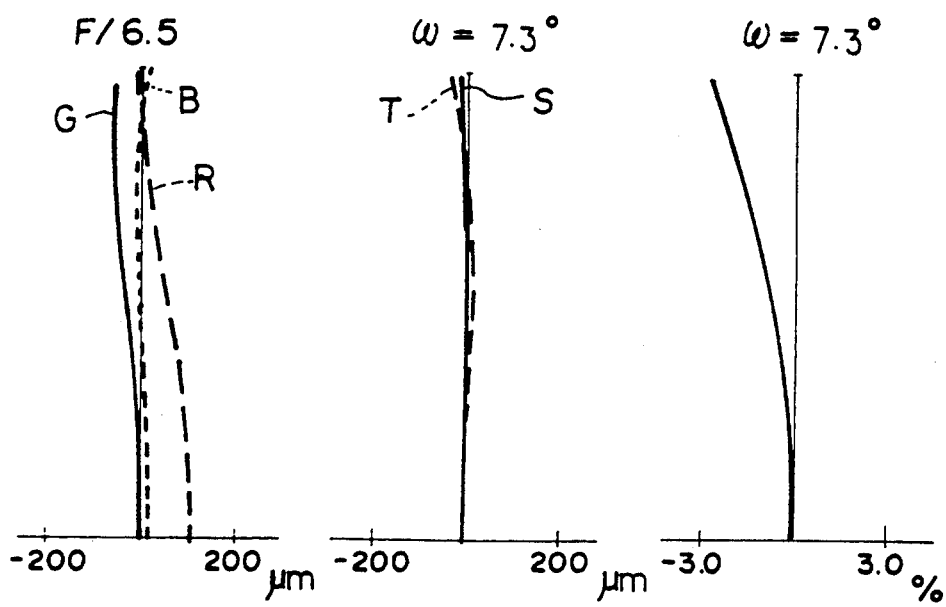

| No. | radius of curvature R | axial surface separation d | refracting index N | Abbe's number $\nu d$ |
|---|---|---|---|---|
| 1 | 71.820 | 2.35 | 1.73692 | 51.2 |
| 2 | 26.320 | 6.50 | | |
| 3 | −32.581 | 2.00 | 1.77620 | 49.6 |
| 4 | 63.302 | 14.00 | 1.55156 | 45.4 |
| 5 | −35.147 | 20.35 | | |
| 6 | 58.561 | 15.00 | 1.51978 | 52.2 |
| 7 | −147.97 | 40.50 | | |
| 8 | −60.595 | 1.50 | 1.78927 | 43.7 |
| 9 | 48.318 | 6.00 | 1.49845 | 81.6 |
| 10 | −48.318 | 1.00 | | |
| 11 | 75.199 | 5.00 | 1.48915 | 70.2 |
| 12 | −65.348 | | | | focal length f1 of the first lens group = −43.77 mm
focal length f2 of the second lens group = 74.48 mm FIGS. 3A to 3C respectively show spherical aberration, astigmatism and distortion of the fixed-focal-length lens system in accordance with the first embodiment.

As can be understood from FIGS. 3A to 3C, the fixed-focal-length lens system in accordance with the first embodiment has excellent optical performances. Further as can be understood from table 1, in the fixed-focal-length lens system in accordance with the first embodiment, the back focus which is the distance between the negative film and the lens face nearest to the negative film can be as long as not shorter than 120 mm, which is substantially long as compared with the conventional fixed-focal-length lens system.

Figure 4:
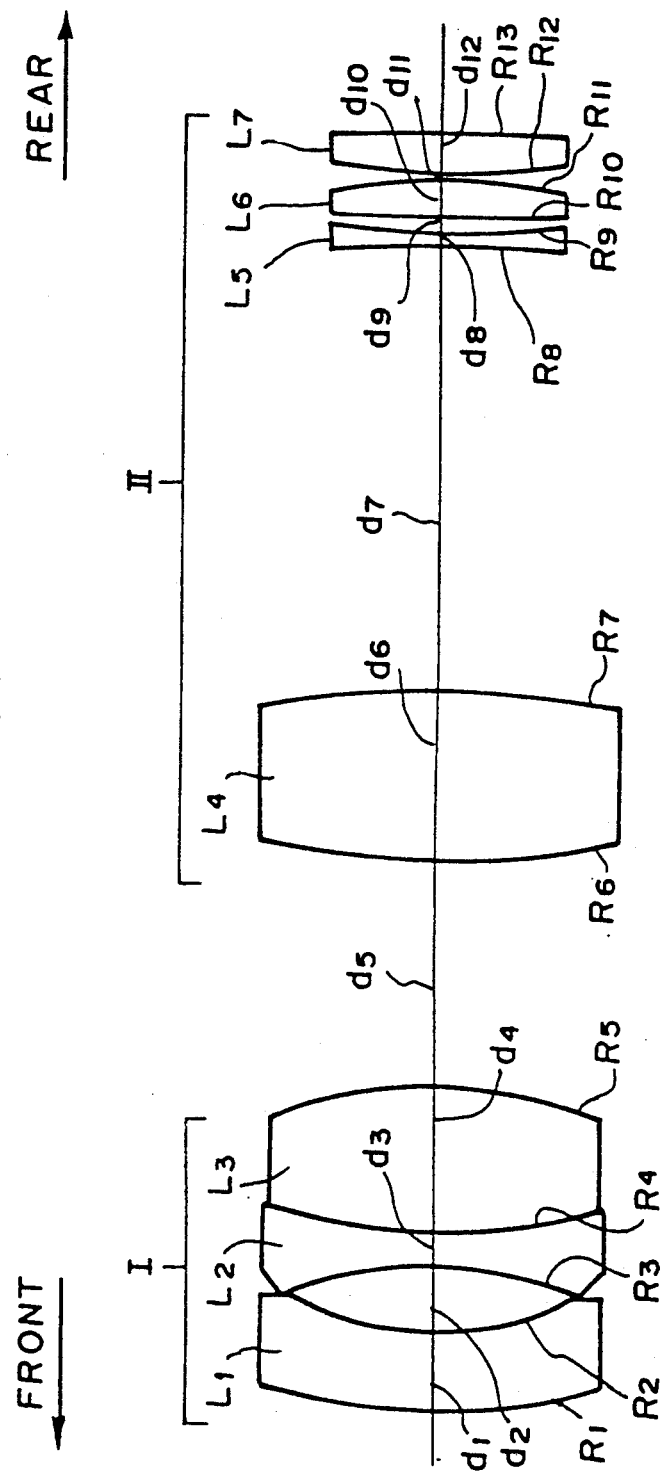
FIG. 4 is a cross-sectional view showing a fixed-focal-length lens system in accordance with a second embodiment of the present invention, FIGS. 5A to 5C respectively show spherical aberration, astigmatism and distortion of the fixed-focal-length lens system in accordance with the second embodiment.

The fixed-focal-length lens system in accordance with the second embodiment of the present invention is shown in FIG. 4. As shown in FIG. 4, the fixed-focal-length lens system in accordance with the second embodiment of the present invention comprises a first lens group I and a second lens group II arranged in this order from front to rear and satisfies the aforesaid conditions (1) to (4). The first lens group I consists of three lenses L1 to L3 arranged in this order from front to rear and has a negative refracting power. The second lens group II consists of four lenses L4 to L7 and has a positive refracting power.

The lens L1 is a negative meniscus lens convex to front, the lens L2 is a double-concave lens having the face of greater curvature faced to front, the lens L3 is a double-convex lens having the face of greater curvature faced to rear, the lens L4 is a double-convex lens having the face of greater curvature faced to front, the lens L5 is a double-concave lens having the face of greater curvature faced to rear, the lens L6 is a double-convex lens having the face of greater curvature faced to rear and the lens L7 is a double-convex lens having the face of greater curvature faced to front.

The magnification M, the focal length f(mm), the effective back focus Bf(mm), F-number $F_{NO}$ and the angle of view $2\omega$ of the fixed-focal-length lens system are as shown in table 3.

TABLE 3

| | |
|---|---|
| magnification M | −1/7.78 |
| focal length f | 60.87 |
| back focus Bf | 109.66 |
| F-number $F_{NO}$ | 6.5 |
| angle of view $2\omega$ | 15.7° |

The radii of curvature R (mm) of the respective lens surfaces, the axial surface separations d (mm) (the central thicknesses of the lenses or the air separations), the refractive indexes N for the sodium d-line of the lenses and the Abbe's numbers νd of the lenses of the fixed-focal-length lens system of the second embodiment are as shown in table 4. In table 4, the numbers in the leftmost column represent the subscripts given to the symbols R, d and L in FIG. 4.

TABLE 4

Figure 5:
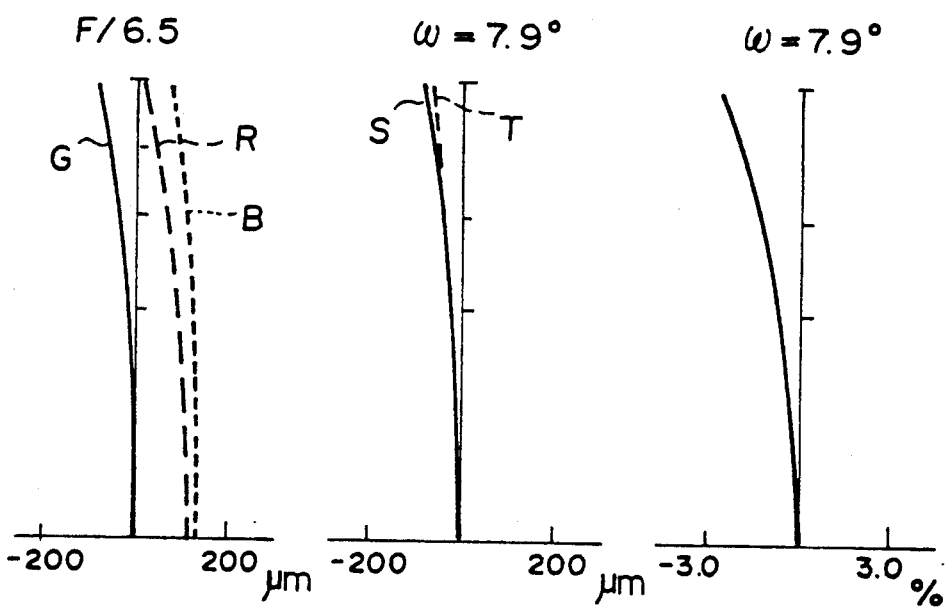

| No. | radius of curvature R | axial surface separation d | refracting index N | Abbe's number νd |
|---|---|---|---|---|
| 1 | 55.121 | 6.736 | 1.73341 | 54.4 |
| 2 | 26.064 | 6.20 | | |
| 3 | −34.287 | 3.11 | 1.77250 | 49.5 |
| 4 | 52.999 | 13.56 | 1.54895 | 44.8 |
| 5 | −37.440 | 21.05 | | |
| 6 | 77.306 | 15.50 | 1.51931 | 68.7 |
| 7 | −86.491 | 40.50 | | |
| 8 | −180.01 | 1.20 | 1.78426 | 30.3 |
| 9 | 97.870 | 1.40 | | |
| 10 | 555.69 | 3.50 | 1.49700 | 81.6 |
| 11 | −54.202 | 0.50 | | |
| 12 | 75.911 | 3.79 | 1.48749 | 70.2 |
| 13 | −235.95 | | | | focal length f1 of the first lens group = −50.16 mm
focal length f2 of the second lens group = 69.84 mm FIGS. 5A to 5C respectively show spherical aberration, astigmatism and distortion of the fixed-focal-length lens system in accordance with the second embodiment.

As can be understood from FIGS. 5A to 5C, the fixed-focal-length lens system in accordance with the second embodiment has excellent optical performances. Further as can be understood from table 3, in the fixed-focal-length lens system in accordance with the second embodiment, the back focus which is the distance between the negative film and the lens face nearest to the negative film can be as long as not shorter than 100 mm, which is substantially long as compared with the conventional fixed-focal-length lens system.

Figure 6:
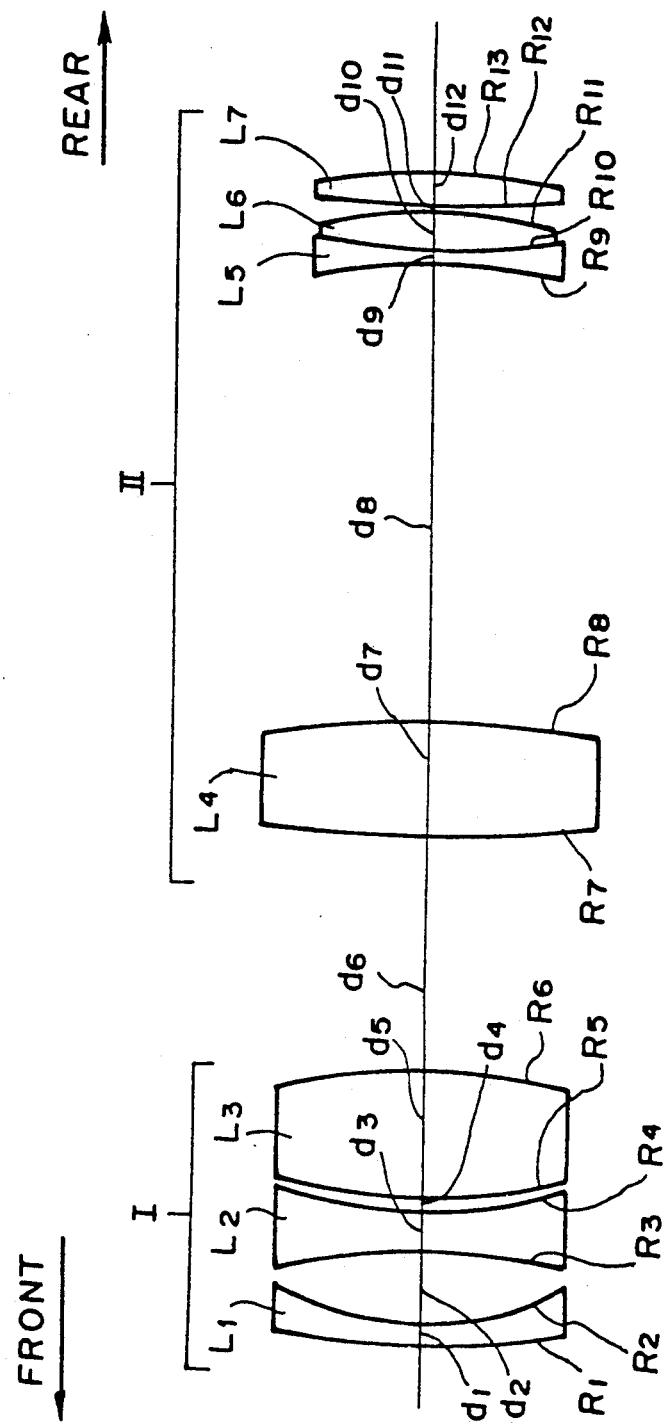
FIG. 6 is a cross-sectional view showing a fixed-focal-length lens system in accordance with a third embodiment of the present invention, and FIGS. 7A to 7C respectively show spherical aberration, astigmatism and distortion of the fixed-focal-length lens system in accordance with the third embodiment.

The fixed-focal-length lens system in accordance with the third embodiment of the present invention is shown in FIG. 6. As shown in FIG. 6, the fixed-focal-length lens system in accordance with the third embodiment of the present invention comprises a first lens group I and a second lens group II arranged in this order from front to rear and satisfies the aforesaid conditions (1) to (4). The first lens group I consists of three lenses L1 to L3 arranged in this order from front to rear and has a negative refracting power. The second lens group II consists of four lenses L4 to L7 and has a positive refracting power.

The lens L1 is a negative meniscus lens convex to front, the lens L2 is a double-concave lens having the face of greater curvature faced to rear, the lens L3 is a double-convex lens having the face of greater curvature faced to front, the lens L4 is a double-convex lens having the face of greater curvature faced to rear, the lens L5 is a double-concave lens having the face of greater curvature faced to front, the lens L6 is a double-convex lens having the face of greater curvature faced to rear and the lens L7 is a double-convex lens having the face of greater curvature faced to rear.

The magnification M, the focal length f(mm), the effective back focus Bf(mm), F-number $F_{NO}$ and the angle of view 2ω of the fixed-focal-length lens system are as shown in table 5.

TABLE 5

| magnification M | −1/7.78 |
|---|---|
| focal length f | 58.59 |

TABLE 5-continued

| back focus Bf | 134.46 |
|---|---|
| F-number $F_{NO}$ | 6.5 |
| angle of view 2ω | 13.3° |

The radii of curvature R(mm) of the respective lens surfaces, the axial surface separations d (mm) (the central thicknesses of the lenses or the air separations), the refractive indexes N for the sodium d-line of the lenses and the Abbe's numbers νd of the lenses of the fixed-focal-length lens system of the third embodiment are as shown in table 6. In table 6, the numbers in the leftmost column represent the subscripts given to the symbols R, d and L in FIG. 6.

TABLE 6

| No. | radius of curvature R | axial surface separation d | refracting index N | Abbe's number νd |
|---|---|---|---|---|
| 1 | 80.654 | 1.85 | 1.73447 | 54.4 |
| 2 | 25.776 | 6.65 | | |
| 3 | −55.910 | 3.78 | 1.77331 | 51.8 |
| 4 | 48.812 | 1.00 | | |
| 5 | 52.056 | 11.75 | 1.54820 | 42.8 |
| 6 | −56.919 | 21.72 | | |
| 7 | 131.23 | 10.59 | 1.61374 | 51.7 |
| 8 | −84.526 | 42.02 | | |
| 9 | −66.228 | 1.40 | 1.78566 | 40.4 |
| 10 | 70.870 | 3.50 | 1.49700 | 81.6 |
| 11 | −46.321 | 0.50 | | |
| 12 | 133.13 | 3.00 | 1.48749 | 70.2 |
| 13 | −60.082 | | | | focal length f1 of the first lens group = −39.26 mm
focal length f2 of the second lens group = 69.80 mm FIGS. 7A to 7C respectively show spherical aberration, astigmatism and distortion of the fixed-focal-length lens system in accordance with the third embodiment.

As can be understood from FIGS. 7A to 7C, the fixed-focal-length lens system in accordance with the third embodiment has excellent optical performances. Further as can be understood from table 5, in the fixed-focal-length lens system in accordance with the third embodiment, the back focus which is the distance between the negative film and the lens face nearest to the negative film can be as long as not shorter than 130 mm, which is substantially long as compared with the conventional fixed-focal-length lens system.

The arrangement of the fixed-focal-length lens system in accordance with the present invention need not be limited to those described above in conjunction with the first to third embodiments, but the number of the lens elements of each lens group, the radius of curvature of each lens element and the like may be variously modified so long as the aforesaid conditions (1) to (4) are satisfied.

Further, though the fixed-focal-length lens system of the present invention is especially useful for an enlarger, it can be applied to various other optical instruments.

What is claimed is;

1. A fixed-focal-length lens system comprising first and second lens groups arranged in order from front to rear, the first lens group consisting of a plurality of lenses and having a negative refracting power and the second lens group consisting of a plurality of lenses and having a positive refracting power, wherein the fixed-focal-length lens system satisfies the following conditions $$0.58 < |f_1/f| < 0.95 \qquad (1)$$

$$0.50 < |f_1/f_2| < 1.0 \tag{2}$$

$$1.6 < Bf/f < 2.9 \tag{3}$$

$$1.1 < f_2/f < 1.45 \tag{4}$$

wherein f represents the focal length of the fixed-focal-length lens system, $f_1$ represents the focal length of the first lens group, $f_2$ represents the focal length of the second lens group and Bf represents the back focus of the lens system.

2. A fixed-focal-length lens system a defined in claim 1 in which said first lens group consists of lenses L1 to L3 and the second lens group consists of lenses L4 to L7, the lens L1 being a negative meniscus lens convex to front, the lens L2 being a double-concave lens having the face of greater curvature faced to front, the lens L3 being a double-convex lens having the face of greater curvature faced to rear, the lens L4 being a double-convex lens having the face of greater curvature faced to front, the lens L5 being a double-concave lens having the face of greater curvature faced to rear, the lens L6 being a double-convex lens whose faces have curvatures substantially equal to each other and the lens L7 being a double-convex lens having the face of greater curvature faced to rear, and the following conditions are satisfied

| radius of curvature R | axial surface separation d | refracting index N | Abbe's number νd |
|---|---|---|---|
| R1 = 71.820 | d1 = 2.35 | N1 = 1.73692 | ν1 = 51.2 |
| R2 = 26.320 | d2 = 6.50 | | |
| R3 = −32.581 | d3 = 2.00 | N2 = 1.77620 | ν2 = 49.6 |
| R4 = 63.302 | d4 = 14.00 | N3 = 1.55156 | ν3 = 45.4 |
| R5 = −35.147 | d5 = 20.35 | | |
| R6 = 58.561 | d6 = 15.00 | N4 = 1.51978 | ν4 = 52.2 |
| R7 = −147.97 | d7 = 40.50 | | |
| R8 = −60.595 | d8 = 1.50 | N5 = 1.78927 | ν5 = 43.7 |
| R9 = 48.318 | d9 = 6.00 | N6 = 1.49845 | ν6 = 81.6 |
| R10 = −48.318 | d10 = 1.00 | | |
| R11 = 75.199 | d11 = 5.00 | N7 = 1.48915 | ν7 = 70.2 |
| R12 = −65.348 | | | | where the focal length of the first lens group is—43.77 mm, the focal length of the second lens group is 74.48 mm and where the radii of curvature of the refracting surfaces, the axial surface separations, the refractive indexes for the sodium d-line and the Abbe's numbers of the lenses L1 to L7 are designated in order from front to rear at R1 to R12, d1 to d11, N1 to N7 and ν1 to ν7.

3. A fixed-focal-length lens system as defined in claim 1 in which said first lens group consists of lenses L1 to L3 and the second lens group consists of lenses L4 to L7, the lens L1 being a negative meniscus lens convex to front, the lens L2 being a double-concave lens having the face of greater curvature faced to front, the lens L3 being a double-convex lens having the face of greater curvature faced to rear, the lens L4 being a double-convex lens having the face of greater curvature faced to front, the lens L5 being a double-concave lens having the face of greater curvature faced to rear, the lens L6 being a double-convex lens having the face of greater curvature faced to rear and the lens L7 being a double-convex lens having the face of greater curvature faced to front, and the following conditions are satisfied

| radius of curvature R | axial surface separation d | refracting index N | Abbe's number νd |
|---|---|---|---|
| R1 = 55.121 | d1 = 6.736 | N1 = 1.73341 | ν1 = 54.4 |
| R2 = 26.064 | d2 = 6.20 | | |
| R3 = −34.287 | d3 = 3.11 | N2 = 1.77250 | ν2 = 49.5 |
| R4 = 52.999 | d4 = 13.56 | N3 = 1.54895 | ν3 = 44.8 |
| R5 = −37.440 | d5 = 21.05 | | |
| R6 = 77.306 | d6 = 15.50 | N4 = 1.51931 | ν4 = 68.7 |
| R7 = −86.491 | d7 = 40.50 | | |
| R8 = −180.01 | d8 = 1.20 | N5 = 1.78426 | ν5 = 30.3 |
| R9 = 97.870 | d9 = 1.40 | | |
| R10 = 555.69 | d10 = 3.50 | N6 = 1.49700 | ν6 = 81.6 |
| R11 = −54.202 | d11 = 0.50 | | |
| R12 = 75.911 | d12 = 3.79 | N7 = 1.48749 | ν7 = 70.2 |
| R13 = −235.95 | | | | where the focal length of the first lens group is—50.16 mm, the focal length of the second lens group is 69.84 mm and where the radii of curvature of the refracting surfaces, the axial surface separations, the refractive indexes for the sodium d-line and the Abbe's numbers of the lenses L1 to L7 are designated in order from front to rear at R1 to R13, d1 to d12, N1 to N7 and ν1 to ν7.

4. A fixed-focal-length lens system as defined in claim 1 in which said first lens group consists of lenses L1 to L3 and the second lens group consists of lenses L4 to L7, the lens L1 being a negative meniscus lens convex to front, the lens L2 being a double-concave lens having the face of greater curvature faced to rear, the lens L3 being a double-convex lens having the face of greater curvature faced to front, the lens L4 being a double-convex lens having the face of greater curvature faced to rear, the lens L5 being a double-concave lens having the face of greater curvature faced to front, the lens L6 being a double-convex lens having the face of greater curvature faced to rear and the lens L7 being a double-convex lens having the face of greater curvature faced to rear, and the following conditions are satisfied

| radius of curvature R | axial surface separation d | refracting index N | Abbe's number νd |
|---|---|---|---|
| R1 = 80.654 | d1 = 1.85 | N1 = 1.73477 | ν1 = 54.4 |
| R2 = 25.776 | d2 = 6.65 | | |
| R3 = −55.910 | d3 = 3.78 | N2 = 1.77331 | ν2 = 51.8 |
| R4 = 48.212 | d4 = 1.00 | | |
| R5 = 52.056 | d5 = 11.75 | N3 = 1.54820 | ν3 = 42.8 |
| R6 = −56.919 | d6 = 21.72 | | |
| R7 = 131.23 | d7 = 10.59 | N4 = 1.61374 | ν4 = 51.7 |
| R8 = −84.526 | d8 = 42.02 | | |
| R9 = −66.228 | d9 = 1.40 | N5 = 1.78566 | ν5 = 40.4 |
| R10 = 70.870 | d10 = 3.50 | N6 = 1.49700 | ν6 = 81.6 |
| R11 = −46.321 | d11 = 0.50 | | |
| R12 = 133.13 | 3.00 | N7 = 1.48749 | ν7 = 70.2 |
| R13 = −60.082 | | | | where the focal length of the first lens group is—39.26 mm, the focal length of the second lens group is 69.80 mm and where the radii of curvature of the refracting surfaces, the axial surface separations, the refractive indexes for the sodium d-line and the Abbe's numbers of the lenses L1 to L7 are designated in order from front to rear at R1 to R13, d1 to d11, N1 to N7 and ν1 to ν7.

* * * * *